(12) United States Patent
Tomita et al.

(10) Patent No.: US 12,730,234 B2
(45) Date of Patent: Sep. 8, 2026

(54) MANUFACTURING METHOD OF RADIATION IMAGING APPARATUS, RADIATION IMAGING APPARATUS, AND RADIATION IMAGING SYSTEM

(71) Applicant: CANON KABUSHIKI KAISHA, Tokyo (JP)

(72) Inventors: Taiji Tomita, Osaka (JP); Masato Ofuji, Gunma (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 18/340,148

(22) Filed: Jun. 23, 2023

(65) Prior Publication Data

US 2024/0053494 A1 Feb. 15, 2024

(30) Foreign Application Priority Data

Aug. 10, 2022 (JP) ................................ 2022-128387

(51) Int. Cl.
*G01T 1/20* (2006.01)

(52) U.S. Cl.
CPC ............ *G01T 1/20185* (2020.05); *G01T 1/20* (2013.01); *G01T 1/2002* (2013.01); *G01T 1/20189* (2020.05); *G01T 1/20184* (2020.05)

(58) Field of Classification Search
CPC ..... G01T 1/20; G01T 1/2002; G01T 1/20184; G01T 1/20185; G01T 1/20189
See application file for complete search history.

(56) References Cited

U.S. PATENT DOCUMENTS

| | | | | |
|---|---|---|---|---|
| 8,642,967 | B2 | 2/2014 | Iwakiri et al. | |
| 8,895,932 | B2 | 11/2014 | Kondo et al. | |
| 2011/0155917 | A1* | 6/2011 | Nomura | H10F 39/024 156/219 |
| 2022/0221597 | A1 | 7/2022 | Beranger et al. | |

FOREIGN PATENT DOCUMENTS

| | | | | |
|---|---|---|---|---|
| JP | 9-54162 | A | 2/1997 | |
| JP | 2006-189377 | A | 7/2006 | |
| JP | 2007-285709 | A | 11/2007 | |
| JP | 2012-13572 | A | 1/2012 | |
| JP | 2012-173276 | A | 9/2012 | |
| JP | 2014-62893 | A | 4/2014 | |
| JP | 2014-238271 | A | 12/2014 | |
| JP | 2017-129462 | A | 7/2017 | |
| JP | 2022-532622 | A | 7/2022 | |
| WO | WO-2019155813 | A1 * | 8/2019 | G01T 1/20 |
| WO | 2020/229499 | A1 | 11/2020 | |

OTHER PUBLICATIONS

English translation of WO 2019155813 (Year: 2019).*
Sasaki et al., U.S. Appl. No. 18/360,027, filed Jul. 27, 2023.

* cited by examiner

*Primary Examiner* — Mark R Gaworecki
(74) *Attorney, Agent, or Firm* — Venable LLP

(57) ABSTRACT

A manufacturing method of a radiation imaging apparatus is provided. The radiation imaging apparatus includes a sensor substrate and a scintillator that are bonded by a bonding member. The manufacturing method includes: preparing a support substrate on which the scintillator has been formed; bonding the sensor substrate and the scintillator via the bonding member; and separating the support substrate after the bonding. The bonding is performed under reduced pressure.

14 Claims, 5 Drawing Sheets

300
320
120
110
220
210
310
340
330
350

300
320
130
230
110
210
310
340
330
220
350

X-RAY ROOM
CONTROL ROOM
DOCTOR'S ROOM
6050
6060
6061
6062
200
6070
6080
6081
6090
6100
6110

MANUFACTURING METHOD OF RADIATION IMAGING APPARATUS, RADIATION IMAGING APPARATUS, AND RADIATION IMAGING SYSTEM

BACKGROUND OF THE INVENTION

Field of the Invention

The present invention relates to a manufacturing method of a radiation imaging apparatus, the radiation imaging apparatus, and a radiation imaging system.

Description of the Related Art

In medical image diagnosis or nondestructive inspection, a radiation imaging apparatus is widely used. International Publication No. 2020/229499 describes that, after forming a scintillator on a substrate for forming a scintillator, the formed scintillator is fixed to a sensor substrate, and then the substrate for forming a scintillator is separated from the scintillator. According to International Publication No. 2020/229499, since the substrate for forming a scintillator is not used in the radiation imaging apparatus, it is possible to select, as the material of the substrate, a material suitable for forming the scintillator without considering the radiation permeability and light reflectivity.

SUMMARY OF THE INVENTION

When fixing a scintillator and a sensor substrate via a bonding member such as an adhesive agent, a bubble may be generated in the bonding member. If a bubble is generated in the bonding member, the light emitted from the scintillator can be scattered by the bubble upon entering the sensor substrate, and the quality of an obtained image may be degraded. In addition, the bubble weakens the bonding force between the scintillator and the sensor substrate, so that when separating the substrate for forming a scintillator, unintended peeling or cracking of the scintillator can occur. It is difficult to repair the peeling-off or crack of the scintillator, and a decrease in the yield of expensive sensor substrates can lead to an increase in cost.

Some embodiments of the preset invention provide a technique advantageous in bonding a scintillator and a sensor substrate.

According to some embodiments, a manufacturing method of a radiation imaging apparatus in which a sensor substrate and a scintillator are bonded by a bonding member, the method comprising: preparing a support substrate on which the scintillator has been formed; bonding the sensor substrate and the scintillator via the bonding member; and separating the support substrate after the bonding, wherein the bonding is performed under reduced pressure, is provided.

According to some other embodiments, a radiation imaging apparatus in which a scintillator and a sensor substrate comprising a main surface with a plurality of pixels arranged thereon are bonded by a bonding member, wherein in an orthogonal projection with respect to the main surface, a bubble extending over a first pixel and an adjacent pixel adjacent to the first pixel does not exist in the bonding member, is provided.

Further features of the present invention will become apparent from the following description of exemplary embodiments (with reference to the attached drawings).

DESCRIPTION OF THE EMBODIMENTS

Figure 1A:
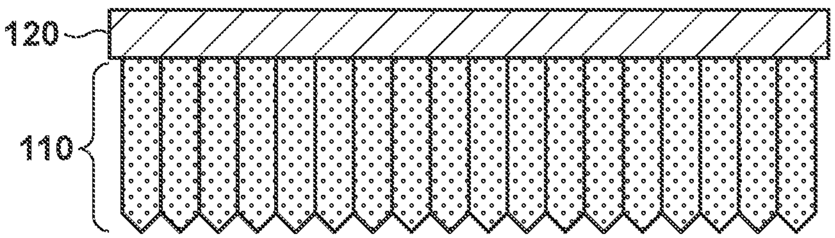
FIG. 1A to 1D are views showing an example of steps of a manufacturing method of a radiation imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Radiation in the present disclosure can include not only α-rays, β-rays, and γ-rays that are beams generated by particles (including photons) emitted by radioactive decay but also beams having equal or more energy, for example, X-rays, particle rays, and cosmic rays.

With reference to FIGS. 1A to 5, a radiation imaging apparatus and a manufacturing method of the radiation imaging apparatus according to an embodiment of the present disclosure will be described. FIGS. 1A to 1D are views showing an example of steps for manufacturing a radiation imaging apparatus 200. The radiation imaging apparatus 200 is a radiation imaging apparatus in which a sensor substrate 210 and a scintillator 110 are bonded by a bonding member 220 as shown in FIG. 1D. The sensor substrate 210 includes a main surface on which a plurality of pixels 141 (shown in FIG. 4) each including a photoelectric conversion element for converting the light emitted from the scintillator 110 into an electric signal are arranged. The main surface of the sensor substrate 210 with the plurality of pixels 141 arranged thereon is arranged so as to face the scintillator 110. In FIG. 1D, the main surface of the sensor substrate 210 is the upward surface of the sensor substrate 210.

The manufacturing method of the radiation imaging apparatus 200 includes a preparation step of preparing a support substrate 120 with the scintillator 110 formed thereon as shown in FIG. 1A. The preparation step may include a step of depositing the scintillator 110 on the support substrate 120. Alternatively, the preparation step may include a step of transferring the scintillator 110 deposited on another substrate onto the support substrate 120. Here, it will be described that the scintillator 110 having a needle-like crystal structure including an alkali metal halide compound is deposited on the support substrate 120.

The scintillator 110 extending in a needle-like form from the support substrate 120 converts the radiation having entered the scintillator 110 into light to which the pixels 141 arranged on the sensor substrate 210 have sensitivity. The scintillator 110 having a needle-like crystal structure including an alkali metal halide compound as a main component may be, for example, cesium iodide (CsI:Tl) doped with thallium as an activator. However, the scintillator 110 is not limited to this, and may be sodium-activated cesium iodide (CsI:Na), cesium bromide (CsBr), or the like. The present disclosure is suitable for the scintillator 110 having a relatively fragile needle-like crystal structure such as an alkali metal halide compound. However, the present disclosure is not limited to this, and can be applied to a scintillator made of a fragile material even if the scintillator does not have the needle-like crystal structure such as an alkali metal halide compound. Further, the present disclosure can be applied when transferring the scintillator arranged on the support substrate 120 onto the sensor substrate 210, regardless of the material of the scintillator.

The scintillator 110 may be formed on the support substrate 120 using a vapor deposition method. Alternatively, the scintillator 110 may be formed by any method such as sublimation, plasma deposition, atomization, growing in a liquid medium with solvent evaporation, or the like. In a state in which the scintillator 110 has been formed on the support substrate 120, the process may advance to a bonding step shown in FIG. 1B. Alternatively, after the scintillator 110 is formed on the support substrate 120, an organic or inorganic protective layer may be formed so as to cover the scintillator 110, and then the process may advance to the bonding step shown in FIG. 1B.

Figure 1B:
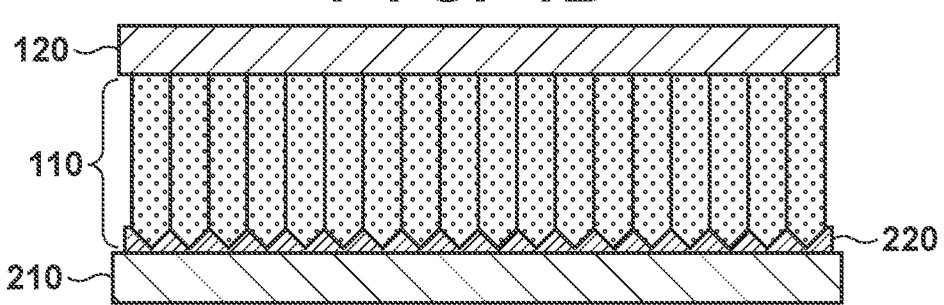

After the scintillator 110 is formed on the support substrate 120, the bonding step of bonding the sensor substrate 210 and the scintillator 110 via the bonding member 220 is performed as shown in FIG. 1B. The bonding step is performed under reduced pressure. The effect of performing the bonding step under reduced pressure will be described later.

Figure 1C:
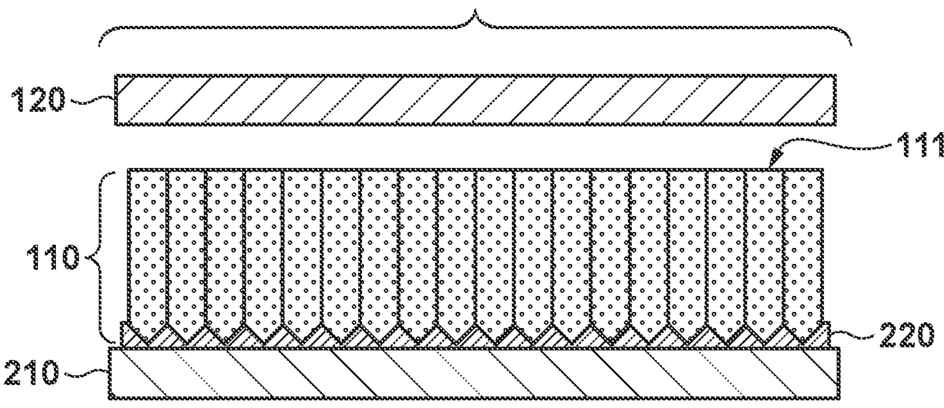

After the sensor substrate 210 and the scintillator 110 are bonded, a separation step of separating the support substrate 120 is performed as shown in FIG. 1C. The separation step of separating the support substrate 120 from the scintillator 110 can be performed by removing the support substrate 120 from the scintillator 110 by a chemical or mechanical method. At this time, it is important that the bonding force between the scintillator 110 and the sensor substrate 210 via the bonding member 220 is larger than the removing force of removing the support substrate 120 from the scintillator 110.

Figure 1D:
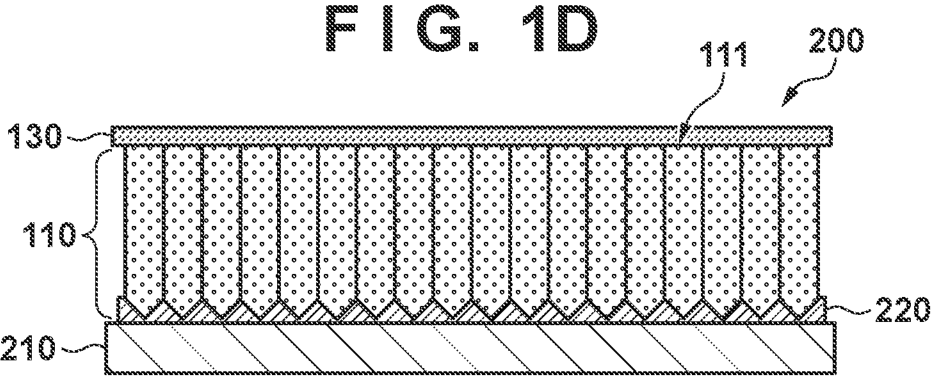

A forming step of forming a protective member 130 at least on a surface 111 of the scintillator 110, which has been in contact with the support substrate 120, as shown in FIG. 1D may be further included after the separation step of separating the support substrate 120 from the scintillator 110. The radiation imaging apparatus 200 shown in FIG. 1D is manufactured while including the steps described above. The arrangement shown in FIG. 1D illustrates that the side surface of the scintillator 110 is exposed, but the side surface of the scintillator 110 may be covered with an appropriate protective layer.

The protective member 130 different from the support substrate 120 need not satisfy the constraints required for the step of depositing the scintillator 110. For example, consider a case of using aluminum as the support substrate 120. Aluminum has excellent heat resistance, but a relatively large film thickness is required to hold the scintillator 110 during the vapor deposition process of the scintillator 110. Accordingly, if the support substrate 120 using aluminum is used in the radiation imaging apparatus 200 without being removed from the scintillator 110, radiation absorption increases. In addition, the thermal expansion coefficient of aluminum is significantly different from that of the sensor substrate 210. Accordingly, if the heat cycle associated with the use of the radiation imaging apparatus 200 or the temperature of the environment around the radiation imaging apparatus 200 changes, cracking may occur in the scintillator 110 or the sensor substrate 210. Alternatively, for example, if graphite is used as the support substrate 120, the support substrate 120 has a low radiation absorptance and excellent heat resistance. However, if the support substrate 120 using graphite is incorporated into the radiation imaging apparatus 200, since graphite has a low light reflectance, it is difficult to reflect, toward the sensor substrate 210, the light emitted from the scintillator 110 and traveling to the support substrate 120 side. As a result, the sensitivity of the radiation imaging apparatus 200 is lowered.

On the other hand, in this embodiment, the support substrate 120 used when forming the scintillator 110 is separated after bonding the scintillator 110 and the sensor substrate 210. Therefore, a material suitable for forming the scintillator 110 can be used for the support substrate 120. In addition, as the protective member 130, it is possible to appropriately select a material that is light, thin, and has a low radiation absorptance. Further, as the protective member 130, it is also possible to select a material having a high reflectivity. The alkali metal halide compound used as the scintillator 110 includes materials that are often deliquescent and known to corrode a metal. While considering these characteristics of the material of the scintillator 110, the protective member 130 may have an appropriate arrangement formed of a metal, an organic material, an inorganic material, or a stacked structure in which a plurality of materials are multilayered.

Since the step of forming the protective member 130 on the surface 111 with the support substrate 120 separated therefrom has few constraints, various processes can be selected in accordance with the material used for the protective member 130. For example, the protective member 130 may be a metal layer or a resin layer formed using a vapor deposition method, a spray method, or a thin layer deposition process. Alternatively, for example, the protective member 130 may be formed by screen printing or the like. Thus, the forming step of forming the protective member 130 may include a step of depositing at least a part of the protective member so as to cover the surface 111 of the scintillator 110. Alternatively, for example, as the protective member 130, a multilayer film formed in advance may be adhered (bonded) to the surface 111 of the scintillator 110 using an adhesive agent (bonding member) or the like. For example, as the multilayer film used for the protective member 130, a multilayer film (PET film/aluminum/PET film) obtained by depositing thin aluminum (about several hundred nm) on a PET film and further coating it with a PET film can be used.

The method of adhering the multilayer film formed in advance is simple and cost effective. For example, the forming step of forming the protective member 130 may include a step of bonding the surface 111 of the scintillator 110 and the protective member 130, which is the multilayer film formed in advance, via a bonding member different from the bonding member 220 under reduced pressure. In this case, as has been described above, the protective member 130 may include resin layers (for example, PET films)

and a metal layer (for example, aluminum) stacked on each other. For example, polyparaxylylene or the like may be formed using a spray method or the like before adhering the multilayer film to the scintillator 110.

The protective member 130 also functions as a sealing material for protecting the scintillator 110 from moisture. Further, for example, if the multilayer film used as the protective member 130 includes a metal layer such as aluminum as has been described above, the protective member 130 also functions as a reflective layer that reflects the light emitted from the scintillator 110. As a result, the sensitivity of the radiation imaging apparatus 200 can be improved. In the arrangement shown in FIG. 1D, the protective member 130 covers the surface 111 of the scintillator 110. However, the protective member 130 is not limited to this, and may also cover the side surface of the scintillator 110. For example, the scintillator 110 may be sealed by the sensor substrate 210 and the protective member 130.

Next, the effect of performing the bonding step of bonding the sensor substrate 210 and the scintillator 110 via the bonding member 220 under reduced pressure will be described. When the bonding member 220 using a resin such as an adhesive agent is placed in a pressure-reduced atmosphere, a gas remaining in the bonding member 220 easily diffuses from the bonding member 220 into the pressure-reduced atmosphere. That is, by performing the bonding step in a reduced pressure state, it is possible to suppress the generation of a bubble in the bonding member 220 bonding the sensor substrate 210 and the scintillator 110. If a bubble is generated in the bonding member 220, the light emitted from the scintillator 110 is scattered or reflected by the bubble upon entering the sensor substrate 210, and the quality of an image obtained by the radiation imaging apparatus 200 is degraded. In addition, the bubble weakens the bonding force between the sensor substrate 210 and the scintillator 110, so that when separating the support substrate 120, peeling or cracking of the scintillator 110 can occur. In this embodiment, by bonding the sensor substrate 210 and the scintillator 110 under reduced pressure, the generation of a bubble in the bonding member 220 is suppressed. Accordingly, it is possible to suppress a decrease in manufacturing yield of the radiation imaging apparatus 200 and a degradation in image quality of the radiation imaging apparatus 200.

Figure 2:
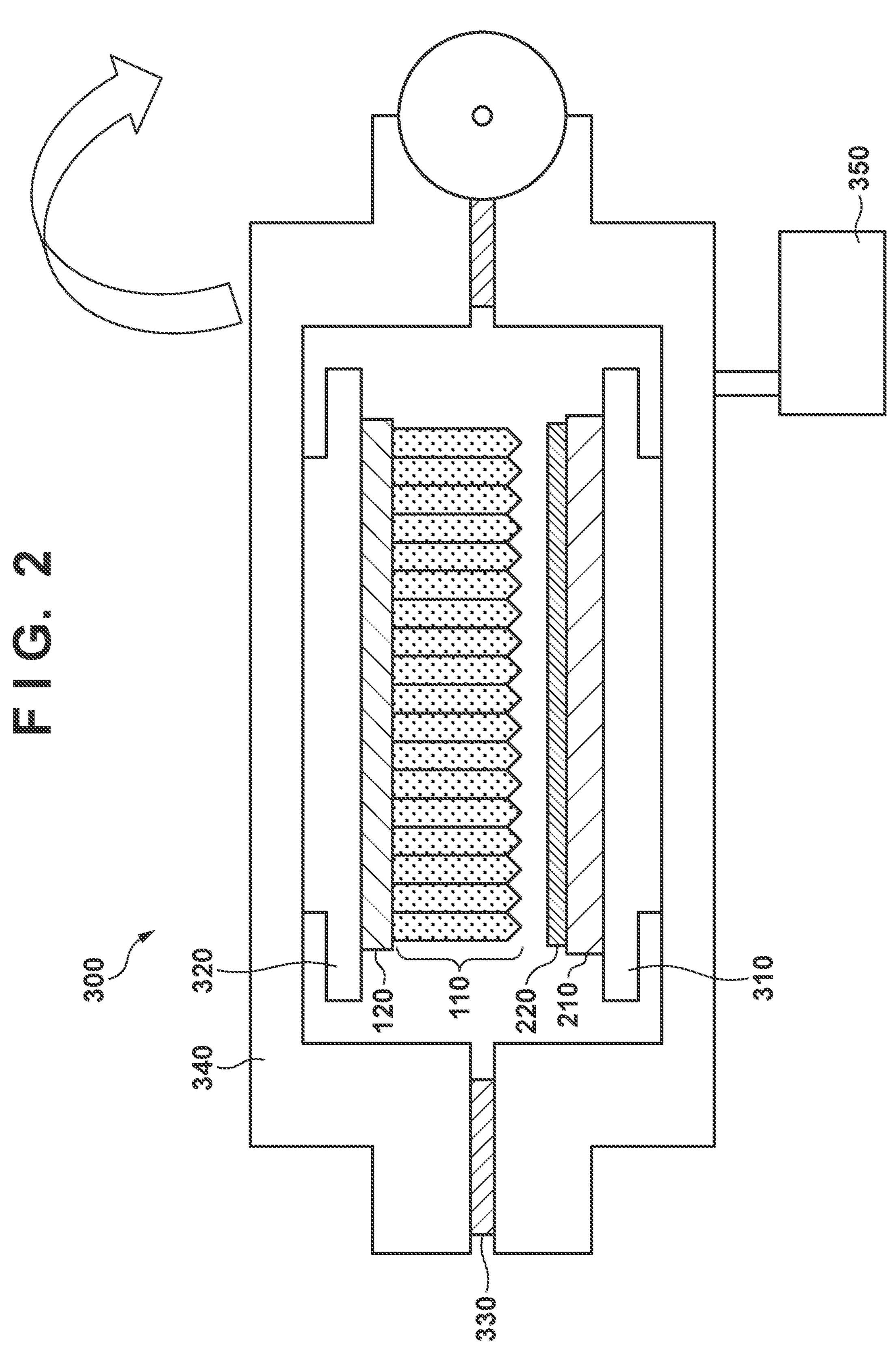
FIG. 2 is a view showing an example of the step of, of the manufacturing method of the radiation imaging apparatus according to the embodiment, bonding a sensor substrate and a scintillator.

For example, a bonding apparatus 300 as shown in FIG. 2 may be used to bond the sensor substrate 210 and the scintillator 110 under reduced pressure. The bonding apparatus 300 can be formed while including a chamber 340, stages 310 and 320 arranged in the chamber 340, a sealing material 330 for sealing the chamber 340, and an evacuation system (for example, a pump 350 or the like) for evacuating the chamber 340. For example, by opening and closing the upper lid of the chamber 340 in the direction of the arrow shown in FIG. 2, the sensor substrate 210, the support substrate 120 with the scintillator 110 formed thereon, and the like can be loaded and unloaded. A reduced pressure state can be created by evacuating the chamber 340 using the pump 350 while the chamber 340 is closed. For example, the bonding step of bonding the sensor substrate 210 and the scintillator 110 via the bonding member 220 may be performed at a pressure (for example, 5 kPa) about half the atmospheric pressure. Alternatively, for example, the bonding step may be performed at a pressure of 500 Pa or less to more effectively remove the gas remaining in the bonding member 220. For example, the bonding step may be performed at a pressure of about 133 Pa. Further, the bonding step may be performed at a pressure of about several ten Pa such as 50 Pa or less. Even by using a commercially available simple pump as the pump 350, the pressure in the chamber 340 can be easily reduced to about several ten Pa.

The stages 310 and 320 may hold the support substrate 120 and the sensor substrate 210, respectively, by vacuum suction. In this case, the surfaces of the stages 310 and 320 can be provided with holes for chucking the support substrate 120 and the sensor substrate 210, respectively. Alternatively, the stages 310 and 320 may physically hold the support substrate 120 and the sensor substrate 210, respectively, by holding claws or the like. The stages 310 and 320 need only have an appropriate arrangement capable of holding the support substrate 120 and the sensor substrate 210, respectively. In addition, at least one of the stage 310 and the stage 320 can be configured to be movable in directions such as the longitudinal direction, the lateral direction, and the vertical direction. After the support substrate 120 (scintillator 110) and the sensor substrate 210 are aligned, the sensor substrate 210 and the scintillator 110 are pressure-bonded in the reduced pressure state.

The bonding member 220 is selected from materials that provide a bonding force larger than the removing force upon removing the support substrate 120 from the scintillator 110 in the separation step shown in FIG. 1C, and is highly transparent with respect to the light emitted from the scintillator 110. The bonding member 220 may be used after performing a deaerating process prior to the bonding step to suppress the generation of a bubble as has been described above. Various resin materials such as, for example, an adhesive agent can be used for the bonding member 220. For example, the support substrate 120 with the scintillator 110 arranged thereon and the sensor substrate 210 with the bonding member 220 arranged thereon are loaded into the chamber 340, the chamber 340 is then evacuated to a predetermined pressure using the pump 350, and after a predetermined time elapses, the sensor substrate 210 and the scintillator 110 may be bonded.

For example, the bonding member 220 may be a thermoplastic resin. The thermoplastic resin is liquefied by application of heat, and its viscosity decreases. Accordingly, by setting a reduced pressure state, the gas (bubble) remaining in the bonding member 220 easily comes out. Therefore, the necessity of the deaerating process (for example, for about several hours) as described above becomes low, so that high throughput can be achieved. As the adhesive agent using a thermoplastic resin used for the bonding member 220, for example, a resin adhesive agent containing a polyolefin resin, a polyester resin, or a polyamide resin as a base polymer (main component) can be used. When a thermoplastic resin is used as the bonding member 220, the stage 310 can be provided with a temperature adjustment function. The stage 320 may be provided with the temperature adjustment function. The temperature adjustment function of the stage 310 or 320 makes it possible to control the state of the thermoplastic resin used as the bonding member 220.

Figure 3:
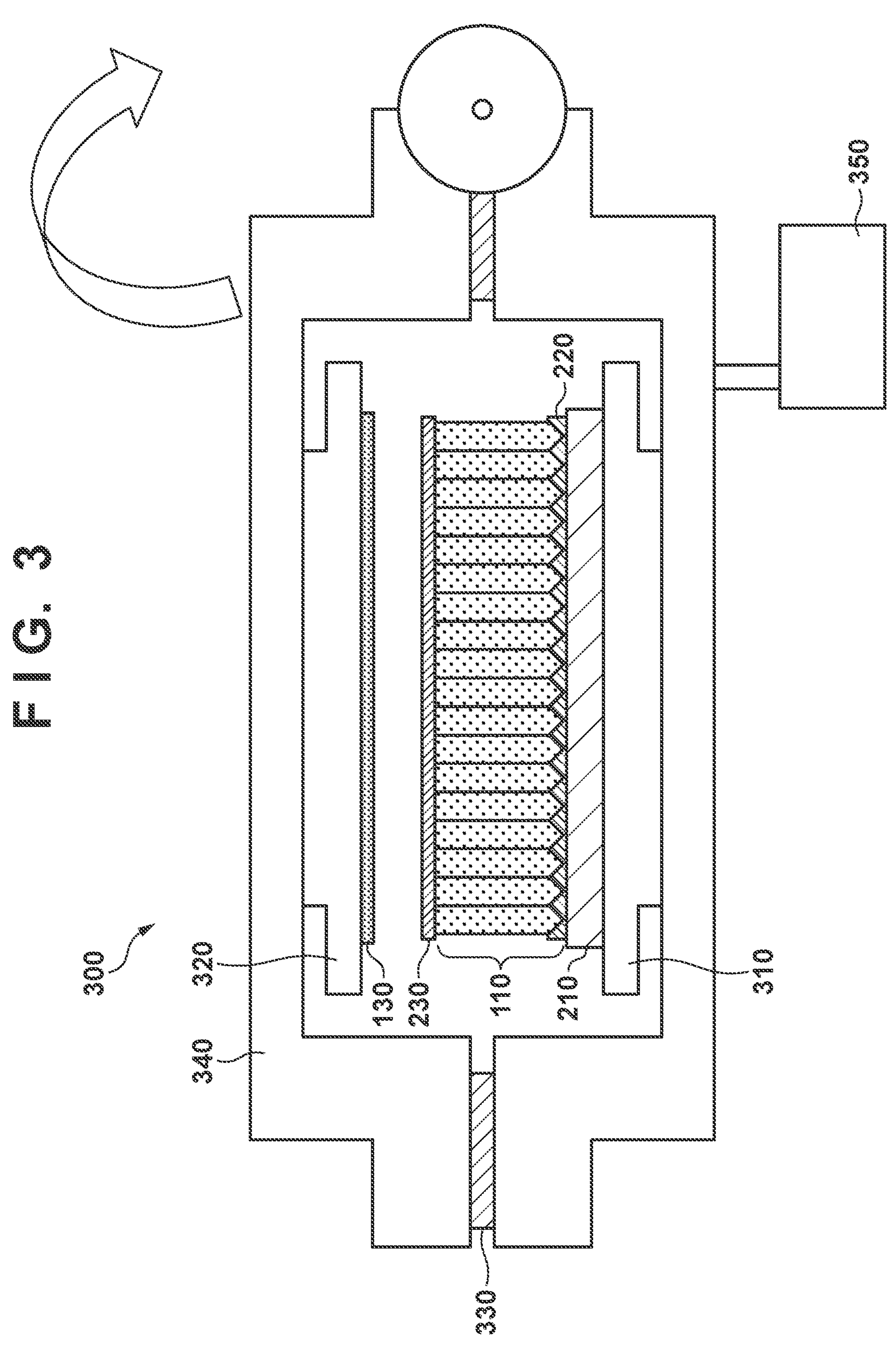
FIG. 3 is a view showing an example of the step of, of the manufacturing method of the radiation imaging apparatus according to the embodiment, forming a protective member on the scintillator.

FIG. 3 is a view schematically showing an example of the forming step of forming the protective member 130 on the surface 111 of the scintillator 110, which has been in contact with the support substrate 120, shown in FIG. 1D. FIG. 3 shows a case in which the surface 111 of the scintillator 110 and the protective member 130 are bonded via the bonding member 230 different from the bonding member 220. In this case, as the protective member 130, for example, a multilayer film having the above-described stacked structure of PET film/aluminum/PET film may be used.

In this manner, when the protective member 130 is formed (attached) on the surface 111 of the scintillator 110 via the bonding member 230, a process similar to the bonding step shown in FIG. 2 may be performed using the bonding apparatus 300. As has been described above, the protective member 130 may include a material such as aluminum that reflects the light emitted from the scintillator 110. If there is a bubble in the bonding member 230, the light emitted from the scintillator 110 and traveling toward the protective member 130 and the light reflected by the protective member 130 and traveling toward the scintillator 110 may be scattered or reflected by the bubble, and the quality of an image obtained by the radiation imaging apparatus 200 can be degraded. By bonding the protective member 130 and the surface 111 of the scintillator 110 via the bonding member 230 under reduced pressure, the generation of a bubble in the bonding member 230 is suppressed. Hence, degradation of the image quality of the radiation imaging apparatus 200 is suppressed. A material similar to that of the bonding member 220 can be used for the bonding member 230.

Here, the bonding apparatus 300 as shown in FIGS. 2 and 3 illustrates an example of an apparatus for bonding members together in a reduced pressure state. However, the gist of the present disclosure is that the bonding step is performed under reduced pressure, and the apparatus for bonding and the like are not limited to the above-described embodiment. Another method and apparatus may be used.

By using the manufacturing method of the radiation imaging apparatus 200 as described above, it is possible to suppress a bubble generated in the bonding member 220 upon bonding the sensor substrate 210 and the scintillator 110. Accordingly, it is possible to suppress a decrease in manufacturing yield of the radiation imaging apparatus 200 and a degradation in image quality of the radiation imaging apparatus 200. However, it is difficult to completely suppress the generation of a bubble in the bonding member 220. On the other hand, by performing the bonding step under reduced pressure, the amount of the gas in the bonding member 220 is reduced, so that not only the probability of generation of a bubble is lowered, but also the generated bubble itself can be decreased.

If there is a bubble in the bonding member 220, the signal value output from the pixel arranged under the bubble among the pixels arranged on the main surface of the sensor substrate 210 can become an abnormal value due to scattering of light by the bubble. However, if the size of the bubble is decreased, the signal value of the pixel that outputs an abnormal value due to the bubble can be corrected using the signal value of an adjacent pixel. Therefore, the radiation imaging apparatus 200 according to this embodiment may have the following arrangement.

Figure 4:
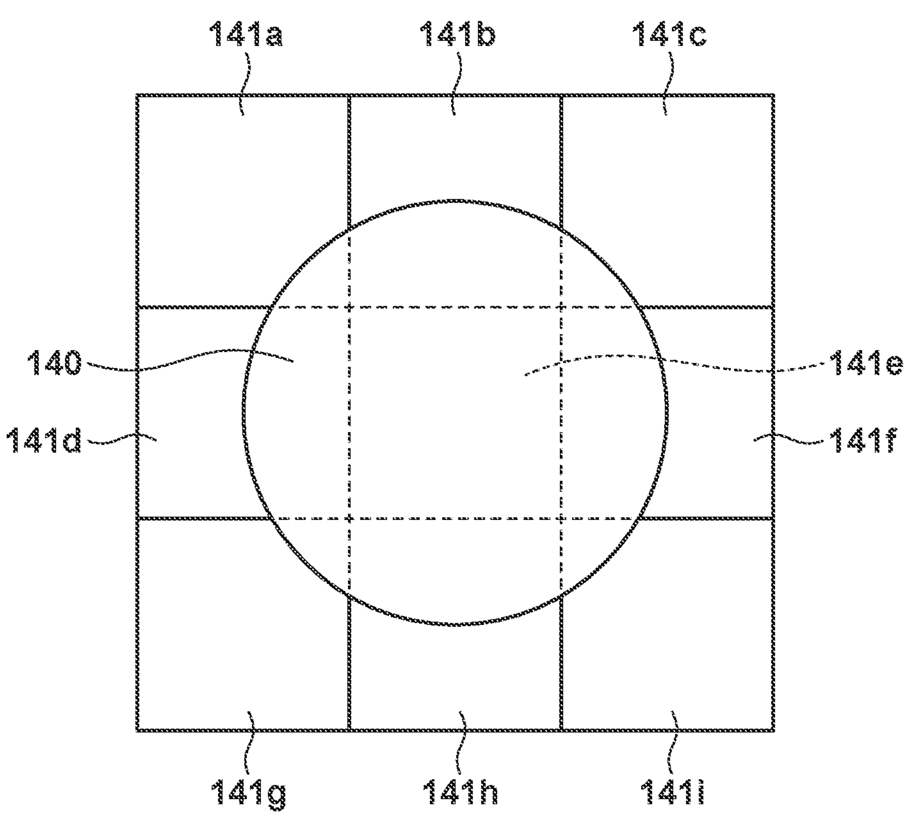
FIG. 4 is a view showing the relationship between pixels of the radiation imaging apparatus and a bubble in a bonding member according to the embodiment.

FIG. 4 is a view for explaining the relationship between the pixels 141 arranged on the main surface of the sensor substrate 210 and a bubble 140. Here, it will be described that the bubble 140 exists on a pixel 141*e*. By performing the bonding step under reduced pressure, the radiation imaging apparatus 200 can be implemented in which the bubble 140 extending over the pixel 141*e* and an adjacent pixel adjacent to the pixel 141*e* in an orthogonal projection with respect to the main surface of the sensor substrate 210 does not exist in the bonding member 220. If the bubble 140 does not exist on the adjacent pixel adjacent to the pixel 141*e*, the signal value of the pixel 141*e* can be easily corrected. Accordingly, degradation of the image quality of the radiation imaging apparatus 200 is suppressed.

Here, the adjacent pixels may include pixels 141*a*, 141*b*, 141*c*, 141*d*, 141*f*, 141*g*, 141*h*, and 141*i* surrounding the pixel 141*e*. If the bubble 140 extending over the pixel 141*e* and the eight pixels 141*a*, 141*b*, 141*c*, 141*d*, 141*f*, 141*g*, 141*h*, and 141*i* adjacent to the pixel 141*e* exists in the bonding member 220, the eight pixels 141*a*, 141*b*, 141*c*, 141*d*, 141*f*, 141*g*, 141*h*, and 141*i* can also have abnormal signal values. Therefore, it becomes difficult to correct the signal value of the pixel 141*e* surrounded by the eight pixels 141*a*, 141*b*, 141*c*, 141*d*, 141*f*, 141*g*, 141*h*, and 141*i*. On the other hand, consider a case in which the bubble 140 extending over the pixel 141*e* and the adjacent pixels (pixels 141*a*, 141*b*, 141*c*, 141*d*, 141*f*, 141*g*, 141*h*, and 141*i*) adjacent to the pixel 141*e* does not exist. In this case, if the bubble 140 does not exist on at least one pixel 141 of the eight pixels 141*a*, 141*b*, 141*c*, 141*d*, 141*f*, 141*g*, 141*h*, and 141*i*, it is possible to correct the signal value of the pixel 141*e* using the signal value of the pixel 141 on which the bubble 140 does not exist. That is, by performing the bonding step under reduced pressure and decreasing the bubble generated in the bonding member 220, degradation of the image quality of the radiation imaging apparatus 200 can be suppressed.

For example, the adjacent pixels may be the pixels 141*b* and 141*h* arranged along one direction, and the pixels 141*d* and 141*f* arranged in a direction intersecting the direction in which the pixels 141*b* and 141*h* are arranged. The pixel 141*e* is arranged between the pixel 141*b* and the pixel 141*h*, and arranged between the pixel 141*d* and the pixel 141*f* A combination of four pixels may include the pixel 141*a*, the pixel 141*i*, the pixel 141*c*, and the pixel 141*g*. Alternatively, a combination of four pixels may include, for example, the pixels 141*a*, 141*i*, 141*b*, and 141*h*. In order to suppress the amount of calculation for correcting the signal value of one pixel 141*e*, it is conceivable to perform correction using the signal values of four pixels 141 such as the upper pixel, the lower pixel, the left pixel, and the right pixel with respect to one pixel 141*e*. Hence, if the bubble 140 extending over two pixels 141, which are arranged in one direction with the pixel 141*e* as the center, and other pixels 141, which are arranged in a direction intersecting the arrangement direction of the two pixels 141, does not exist, the signal value of the pixel 141*e* can be corrected using the signal values of the pixels 141 on which the bubble 140 does not exist.

For example, in an inspection step after manufacturing the radiation imaging apparatus 200, the four pixels 141 as described above are set as adjacent pixels, and if the bubble 140 extending over the pixel 141*e* and the adjacent pixels adjacent to the pixel 141*e* does not exist, the radiation imaging apparatus 200 is considered as passing the inspection. When correcting the signal value of the pixel 141*e* using the eight pixels 141*a*, 141*b*, 141*c*, 141*d*, 141*f*, 141*g*, 141*h*, and 141*i* surrounding the pixel 141*e* in the radiation imaging apparatus 200 that has passed the inspection, the signal values of five or more pixels 141 can be used to perform correction. That is, the quality of an image obtained by the radiation imaging apparatus 200 can be improved.

Further, in order to suppress the amount of calculation for correcting the signal value of one pixel 141, it is conceivable to perform correction using two pixels 141 arranged in one direction with the pixel 141*e* as the center. For example, the pixel 141*b* and the pixel 141*h* are used to correct the signal value of the pixel 141*e*. In this case, if the bubble extending over the pixel 141*e* and the pixels 141*b* and 141*h*, which are adjacent pixels adjacent to the pixel 141*e*, does not exist in the bonding member 220, the signal value of the pixel 141*e* can be corrected.

For example, in the inspection step after manufacturing the radiation imaging apparatus 200, the two pixels 141 as described above are set as adjacent pixels, and if the bubble 140 extending over the pixel 141*e* and the adjacent pixels adjacent to the pixel 141*e* does not exist, the radiation imaging apparatus 200 is considered as passing the inspection. When correcting the signal value of the pixel 141*e* using the eight pixels 141*a*, 141*b*, 141*c*, 141*d*, 141*f*, 141*g*, 141*h*, and 141*i* surrounding the pixel 141*e* in the radiation imaging apparatus 200 that has passed the inspection, the signal values of seven or more pixels 141 can be used to perform correction. That is, the quality of an image obtained by the radiation imaging apparatus 200 can be further improved.

When manufacturing the radiation imaging apparatus 200 according to this embodiment, in the step of bonding the sensor substrate 210 and the scintillator 110 via the bonding member 220, bonding is performed under reduced pressure. Thus, the density of a bubble generated in the bonding member 220 is suppressed, and the size of the bubble is decreased. Therefore, the possibility of generation of the bubble 140 extending from the pixel 141*e* up to the adjacent pixels adjacent to the pixel 141*e* is lowered. With this, even if the bubble 140 exists, the correction accuracy of the signal value of the pixel 141*e* arranged under the bubble 140 is improved, and as a result, the quality of an image obtained by the radiation imaging apparatus 200 is improved.

Figure 5:
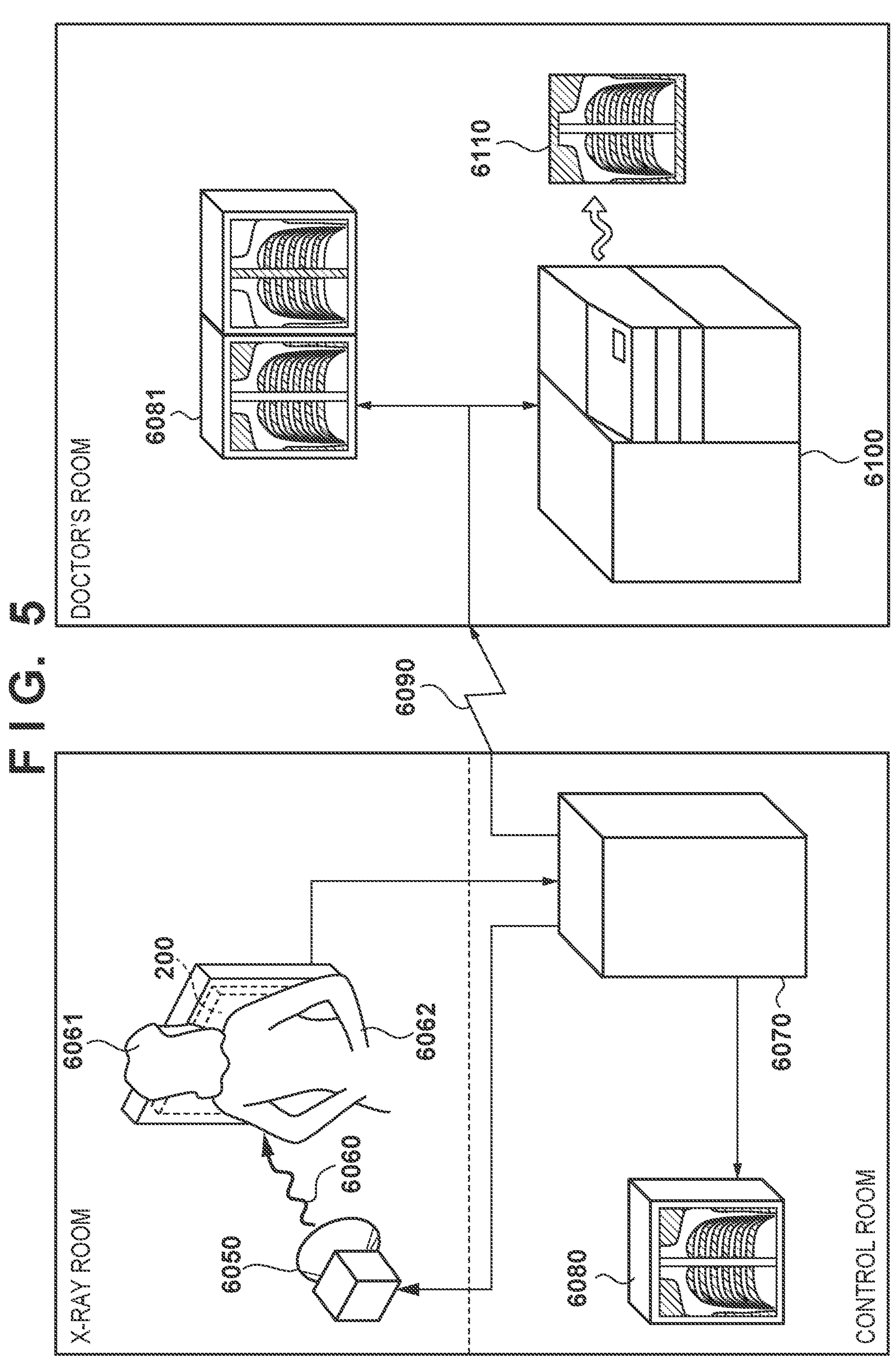
FIG. 5 is a view showing an example of the configuration of a radiation imaging system using the radiation imaging apparatus according to the embodiment.

A radiation imaging system incorporating the above-described radiation imaging apparatus 200 will exemplarily be described below with reference to FIG. 5. X-rays 6060 generated by an X-ray tube 6050 serving as a radiation source for emitting radiation to the radiation imaging apparatus 200 pass through a chest 6062 of a patient or object 6061 and enter the radiation imaging apparatus 200. The incident X-rays include the internal body information of the patient or object 6061. In the radiation imaging apparatus 200, the scintillator 110 emits light in response to the incidence of the X-rays 6060, and the emitted light is photoelectrically converted by photoelectric conversion elements to obtain electrical information. This information is converted into digital data, undergoes image processing by an image processor 6070 serving as a signal processing unit, and can be observed on a display 6080 serving as a display unit in a control room.

Also, this information can be transferred to a remote place by a transmission processing unit such as a telephone network 6090. This allows the information to be displayed on a display 6081 serving as a display unit in a doctor's office or the like in another place, and allows a doctor who is in a remote place to make a diagnosis. In addition, the information can be recorded on a recording medium such as an optical disk, and a film processor 6100 can also record the information on a film 6110 serving as a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-128387, filed Aug. 10, 2022, which is hereby incorporated by reference herein in its entirety.

What is claimed is:

1. A manufacturing method of a radiation imaging apparatus in which a sensor substrate and a scintillator are bonded by a bonding member, the method comprising:

preparing a support substrate on which the scintillator has been formed;

bonding the sensor substrate and the scintillator via the bonding member; and separating the support substrate after the bonding, wherein the bonding is performed under reduced pressure, wherein the sensor substrate comprises a main surface with a plurality of pixels arranged thereon, wherein a bubble exists in the bonding member over a first pixel of the plurality of pixels, and wherein in an orthogonal projection with respect to the main surface, no bubble extends over both the first pixel and an adjacent pixel adjacent to the first pixel in the bonding member.

2. The method according to claim 1, further comprising forming a protective member on at least a surface of the scintillator, which has been in contact with the support substrate, after the separating.

3. The method according to claim 2, wherein the forming comprises bonding the surface and the protective member via a bonding member different from the bonding member under reduced pressure.

4. The method according to claim 2, wherein the forming comprises depositing at least a part of the protective member so as to cover the surface.

5. The method according to claim 2, wherein the protective member comprises a resin layer and a metal layer stacked on each other.

6. The method according to claim 1, wherein the bonding member comprises a thermoplastic resin.

7. The method according to claim 1, wherein the scintillator has a needle-like crystal structure comprising an alkali metal halide compound.

8. The method according to claim 1, wherein the preparing comprises depositing the scintillator on the support substrate.

9. The method according to claim 1, wherein the bonding is performed at a pressure of not more than 500 Pa.

10. A radiation imaging apparatus in which a scintillator and a sensor substrate comprising a main surface with a plurality of pixels arranged thereon are bonded by a bonding member, wherein a bubble exists in the bonding member over a first pixel of the plurality of pixels, and wherein in an orthogonal projection with respect to the main surface, no bubble extends over both the first pixel and an adjacent pixel adjacent to the first pixel in the bonding member.

11. The apparatus according to claim 10, wherein adjacent pixels adjacent to the first pixel comprise a second pixel and a third pixel, in the orthogonal projection with respect to the main surface, the first pixel, the second pixel, and the third pixel are arranged in one direction such that the first pixel is arranged between the second pixel and the third pixel, and in the orthogonal projection with respect to the main surface, a bubble extending over the first pixel and the adjacent pixels does not exist in the bonding member.

12. The apparatus according to claim 11, wherein the adjacent pixels further comprise a fourth pixel and a fifth pixel, and in the orthogonal projection with respect to the main surface, the first pixel, the fourth pixel, and the fifth pixel are arranged in a direction intersecting the one direction such that the first pixel is arranged between the fourth pixel and the fifth pixel.

13. The apparatus according to claim 12, wherein the adjacent pixels further comprise a sixth pixel, a seventh pixel, an eighth pixel, and a ninth pixel, and in the orthogonal projection with respect to the main surface, the first pixel is surrounded by the second pixel, the third pixel, the fourth pixel, the fifth pixel, the sixth pixel, the seventh pixel, the eighth pixel, and the ninth pixel.

14. A radiation imaging system comprising:

the radiation imaging apparatus according to claim 10; and a signal processor configured to process a signal output from the radiation imaging apparatus.

* * * * *